(No Model.)

E. GOSS.
SELF OILING PULLEY.

No. 432,666. Patented July 22, 1890.

Witnesses
Frank Dorian
Chas. J. Stockman

Inventor
Edward Goss
By his Attorney in fact,
Chas. E. Barber

UNITED STATES PATENT OFFICE.

EDWARD GOSS, OF HARTFORD, VERMONT.

SELF-OILING PULLEY.

SPECIFICATION forming part of Letters Patent No. 432,666, dated July 22, 1890.

Application filed January 8, 1889. Serial No. 295,732. (No model.)

*To all whom it may concern:*

Be it known that I, EDWARD GOSS, a citizen of the United States, residing at Hartford, in the county of Windsor, State of Vermont, have invented certain new and useful Improvements in Self-Oiling Pulleys, of which the following is so full, clear, and exact a description as will enable others skilled in the art to which my invention belongs to make and use the same, reference being had to the accompanying drawings, in which—

Figure 1:
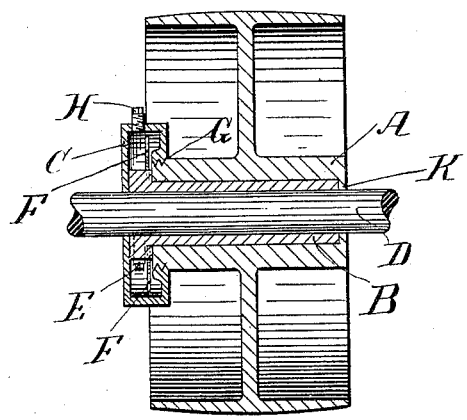
Figure 2:
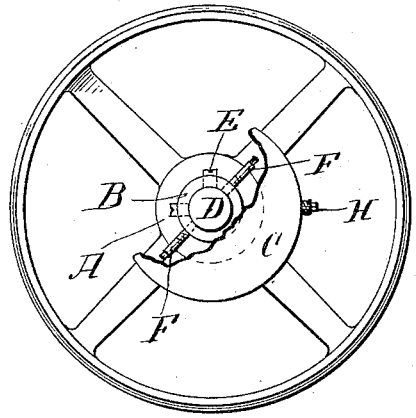
Figure 3:
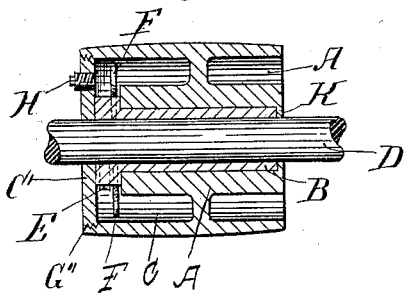
Figure 4:
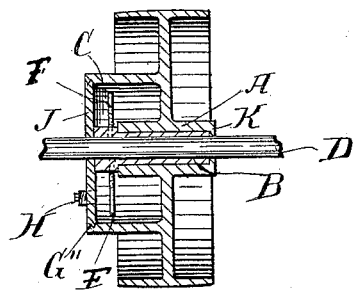

Figure 1 is a sectional view of a loose pulley to which my improvement is applied. Fig. 2 is an end view of a pulley with part of oil-reservoir broken away. Fig. 3 is a sectional view of a small pulley having the oil-reservoir formed within the body of the same and closed at its outer end by a cap-plate. Fig. 4 is a sectional view of a pulley having its reservoir cast on one side of the pulley, with a cap-plate at its end.

The object of my invention is to provide a loose pulley with a device for automatically oiling the same.

In the drawings, A represents the hub of the pulley, and B the bushing or sleeve upon which the pulley revolves. Said sleeve is enlarged at the end which projects into the oil-reservoir C, and is fastened to the shaft D by means of a set-screw E, which prevents said sleeve from turning with the pulley.

Fastened to the sleeve B and extending from opposite sides thereof into the oil-reservoir are two pins F F.

Various modifications in the construction of the oil-reservoir are shown in the drawings. In Fig. 1 it is shown as made separately from and screwed upon the hub of the pulley, as shown at G. In Fig. 3 it is formed in the body of the pulley and has a plate C' attached to the rim, as shown at G'', which closes one of the ends of the reservoir, and in Fig. 4 it is formed by an annular cylinder cast on the side of the pulley-web, extending out far enough to take the plate J, as shown. Each one of the reservoirs is provided with a perforation H, forming a plug-hole, through which the reservoir is supplied with oil.

The hubs of the pulleys illustrated in the accompanying drawings are provided with flanges K on the ends opposite the oil-reservoir, which flanges fit loosely over the shaft D and prevent the escape of oil, and the end of the oil-reservoir is bored to fit closely over the shaft for the same purpose.

The operation of my device is as follows: The oil is poured into the reservoir C through the plug-hole H until the oil is about on a level with the under side of the shaft D. The pulley then being started, the oil, by centrifugal force, is thrown to the inner wall of the reservoir, where it strikes the pins F F, one of which is always on or above a level with the oil and catches the oil and conveys it to the bushing at the end of the hub, where it works its way through, but can go no farther than the flanges or shoulders K on the end of the hub, and, the side of the oil-reservoir C being bored to fit the shaft, the oil cannot escape at either end.

I have shown in the drawings a reservoir on one end of the pulley only; but where pulleys of greater length than eight inches are used it is better to have a reservoir at each end. Where pulleys are run slowly with frequent stops it is not always necessary to use the pins F F.

The special construction of the pulley is made the subject of another application, filed August 30, 1889, Serial No. 322,471. No claim, therefore is made for such construction in the present application.

The advantages presented by this device are numerous, and it would require great space to enumerate them. Among the most important, however, are the positive prevention of waste of oil, the capacity of the pulley to run for a long period of time at a high rate of speed without the necessity of stopping, and the lessening of expense and annoyance consequent therefrom.

I do not wish to be understood as limiting myself to the exact construction shown and described, as many details of construction might be varied or mechanical equivalents substituted without departing from the spirit of my invention or in any way interfering with its usefulness.

Having now described the objects, uses, and advantages of my device, and having set forth a preferred method of construction of the same, what I believe to be new, and desire to secure by Letters Patent of the United States, and what I therefore claim, is—

A pulley and a shaft, in combination with a bushing surrounding said shaft, an oil-reservoir attached to the end of the hub and surrounding the end of said bushing, and pins extending outwardly from said bushing into the oil-reservoir, all substantially as shown, and for the purposes set forth.

In testimony whereof I affix my signature in the presence of two witnesses.

EDWARD GOSS.

Witnesses:
J. L. BACON,
G. F. HINCKLEY.